(12) United States Patent
Liu et al.

(10) Patent No.: US 11,379,670 B1
(45) Date of Patent: Jul. 5, 2022

(54) AUTOMATICALLY POPULATING RESPONSES USING ARTIFICIAL INTELLIGENCE

(71) Applicant: SPLUNK INC., San Francisco, CA (US)

(72) Inventors: Ningwei Liu, Palo Alto, CA (US); Wangyan Feng, Sunnyvale, CA (US); Aaron Chan, Milpitas, CA (US); Joel Fulton, Aptos, CA (US)

(73) Assignee: Splunk, Inc., San Francisco, CA (US)

( * ) Notice: Subject to any disclaimer, the term of this patent is extended or adjusted under 35 U.S.C. 154(b) by 314 days.

(21) Appl. No.: 16/588,718

(22) Filed: Sep. 30, 2019

(51) Int. Cl.
*G06F 40/30* (2020.01)
*G06N 5/02* (2006.01)
*G06N 5/04* (2006.01)
*G06F 40/284* (2020.01)
*G06F 16/33* (2019.01)
*G06F 16/332* (2019.01)
*G06F 16/9032* (2019.01)
*G10L 15/22* (2006.01)

(52) U.S. Cl.
CPC .......... *G06F 40/30* (2020.01); *G06F 16/3329* (2019.01); *G06F 16/3344* (2019.01); *G06F 16/90332* (2019.01); *G06F 40/284* (2020.01); *G06N 5/022* (2013.01); *G06N 5/048* (2013.01); *G10L 15/22* (2013.01)

(58) Field of Classification Search
CPC ............. G06F 16/3329; G06F 16/3344; G06F 16/90332; G06F 40/284; G06F 40/30; G06N 5/022; G06N 5/048; G10L 15/22
See application file for complete search history.

(56) References Cited

U.S. PATENT DOCUMENTS 9,659,248 B1 * 5/2017 Barbosa ............... G06N 3/0454
10,692,006 B1 * 6/2020 Zhang .................... G06N 20/00
(Continued)

OTHER PUBLICATIONS

T. KasthuriArachchi and E. Y. A. Charles, "Deep Learning Approach to Detect Plagiarism in Sinhala Text," 2019 14th Conference on Industrial and Information Systems (ICIIS), 2019, pp. 314-319, doi: 10.1109/ICIIS47346.2019.9063299 (Year: 2019).*
(Continued)

*Primary Examiner* — Eric Yen
(74) *Attorney, Agent, or Firm* — Kyle M. St. James; Rutan & Tucker, LLP

(57) ABSTRACT

A computerized method is disclosed including operations of receiving one or more request texts, including at least a first request text, automatically performing processing on the first request text to determine a most similar request text in a knowledge base, determining a degree of similarity between the first request text and the most similar request text, and in response to a comparison between the degree of similarity and a similarity threshold, retrieving, from the knowledge base, an answer corresponding to the most similar request text. Performing processing may include (i) removing stop words and punctuation and creating tokenized text, (ii) converting the tokenized text into a vector using a trained neural network, and (iii) performing an analysis of the vector with the entries of the knowledge base using one or more of a Word Mover's Distance (WMD) algorithm, or a Soft Cosine Measure (SCM) algorithm.

33 Claims, 8 Drawing Sheets

(56) References Cited

U.S. PATENT DOCUMENTS

| | | | | |
|---|---|---|---|---|
| 10,824,661 | B1* | 11/2020 | Huang | G06F 16/34 |
| 11,055,355 | B1* | 7/2021 | Monti | G10L 15/22 |
| 2010/0145673 | A1* | 6/2010 | Cancedda | G06F 16/951 |
| | | | | 704/3 |
| 2012/0303358 | A1* | 11/2012 | Ducatel | G06F 16/30 |
| | | | | 704/9 |
| 2013/0144890 | A1* | 6/2013 | Liu | G06F 16/35 |
| | | | | 707/749 |
| 2013/0304730 | A1* | 11/2013 | Zhou | G06Q 30/02 |
| | | | | 707/723 |
| 2014/0236579 | A1* | 8/2014 | Kurz | G06F 16/3344 |
| | | | | 704/9 |
| 2014/0358890 | A1* | 12/2014 | Chen | G06F 16/3329 |
| | | | | 707/710 |
| 2017/0357927 | A1* | 12/2017 | Antonio | G06F 40/284 |
| 2018/0137137 | A1* | 5/2018 | Jin | G06F 16/90324 |
| 2018/0329882 | A1* | 11/2018 | Bennett | G06F 16/243 |
| 2018/0357219 | A1* | 12/2018 | Li | G06F 16/3344 |
| 2019/0057143 | A1* | 2/2019 | Porter | G06Q 10/10 |
| 2019/0188271 | A1* | 6/2019 | Murdock | G06F 16/24575 |
| 2019/0354630 | A1* | 11/2019 | Guo | G10L 15/22 |
| 2020/0110800 | A1* | 4/2020 | Astigarraga | G06F 40/186 |
| 2020/0287850 | A1* | 9/2020 | Ferrari | G06F 16/958 |
| 2020/0342771 | A1* | 10/2020 | Mohan | G08G 5/0013 |

OTHER PUBLICATIONS

Ghadery, E., Movahedi, S., Jalili Sabet, M., Faili, H., & Shakery, A., "LICD: A language-independent approach for aspect category detection Springer Verlag", Apr. 2019, pp. 575-589 (Year: 2019).*

Husner, M. J., et al. "FromWord Embeddings to Document Distances" Proceedings of the 32nd International Conference on Machine Learning, JMLR: W&CP vol. 37. (2015).

Papineni, K. et al. "BLEU: a Method for Automatic Evaluation of Machine Translation" Proceedings of the 40th Annual Meeting of the Association for Computational Linguistics (ACL), pp. 311-318, Jul. 2002.

Sidorov, G. et al. "Soft Similarity and Soft Cosine Measure: Similarity of Features in Vector Space Model" Computacion y Sistemas vol. 18, No. 3, 2014 pp. 491-504. DOI: 10 13053/CyS-18-3-2043. (2014).

* cited by examiner

FIG. 5B

Incident Review | Actions ▼

Status: [ ]  Urgency: [high]  Owner: [ ]  Title: [ ]
Security domain: [ ]  Governance: [pci]  Search: [ ]

511

513

514

512 — 24 hour window ▼
Last 15 minutes
Last 60 minutes
Last 4 hours
Last 24 hours
Last 7 days
Last 30 days
Last year
Real-time
Other
All time
Custom time...

| Select | Options | Time | Security Domain | Title | Urgency | Status | Owner | |
|---|---|---|---|---|---|---|---|---|
| ☐ | ▶ | 8/26/12 11:11:03.000 AM | Access ▼ | Insecure Or Cleartext Authentication Detected ▼ | ⊙High ▼ | New ▼ | Unassigned ▼ | View details |
| ☐ | ▶ | 8/26/12 11:10:07.000 AM | Access ▼ | Insecure Or Cleartext Authentication Detected ▼ | ⊙High ▼ | New ▼ | Unassigned ▼ | View details |
| ☐ | ▶ | 8/26/12 11:00:39.000 AM | Access ▼ | Account (blinebry) Deleted On (PROD-POS-001) ▼ | ⊙High ▼ | New ▼ | Unassigned ▼ | View details |

AUTOMATICALLY POPULATING RESPONSES USING ARTIFICIAL INTELLIGENCE

FIELD

Embodiments of the disclosure relate to systems and computerized methods directed to automatically populating request text. More specifically, one embodiment of the disclosure relates to a computerized method configured to automatically populate request text of a received questionnaire through the use of artificial intelligence.

GENERAL BACKGROUND

Questionnaires, known as a set of questions for obtaining data, have long provided to individuals or corporations for various reasons. In some instances, a company may provide a questionnaire to an individual it is considering for employment. In other instances, a company may provide questionnaire to a second company it is considering engaging with in business. In one example, service providers often familiar with the process of receiving questionnaires, such as Request for Proposals (RFPs), from potential customers or clients. Typically, a RFP includes a statement of specific requirements that the potential customer is looking for from a service provider, and such specific requirements need to be satisfied prior to the service providers obtaining the business of the potential customer.

Generally, a questionnaire includes a plurality of questions to be answered. As used herein, each question may be referred to as a "request text." In some instances, the number of questions provided in a questionnaire may be large, numbering in the tens or even hundreds. Thus, responding to a questionnaire can be a very time consuming and resource intensive activity. In some instances, such as when a RFP is provided to a service provider, the service provider is required to take time away from servicing current customers, engaging with other potential customers and further refining or improving the services it provides in order to complete the RFP.

The process of completing a questionnaire often involves an analysis of various documents and/or a determination of statistics, etc., that, when analyzed by human users, may lead to erroneous or incomplete answers (e.g., human error such as transposing numbers or miscalculating statistics). Additionally, when human users are tasked with completing multiple questionnaires, the answers provided may differ even though the questions are the same or similar among the multiple questionnaires. In view of the above, there are issues with the current state of populating questionnaires such as RFPs. Therefore, one objective of the disclosure is to provide an automated computerized process for populating request texts in order to complete questionnaires. The automated computerized process may additionally involve the automated analysis of various documents or data in order to correctly determine statistics or other answers requested in the questionnaire.

BRIEF DESCRIPTION OF THE DRAWINGS

The present disclosure is illustrated by way of example, and not limitation, in the figures of the accompanying drawings, in which like reference numerals indicate similar elements and in which:

FIG. 5B is an interface diagram of an example user interface of an incident review dashboard, in accordance with example embodiments;

DETAILED DESCRIPTION

Figure 1:
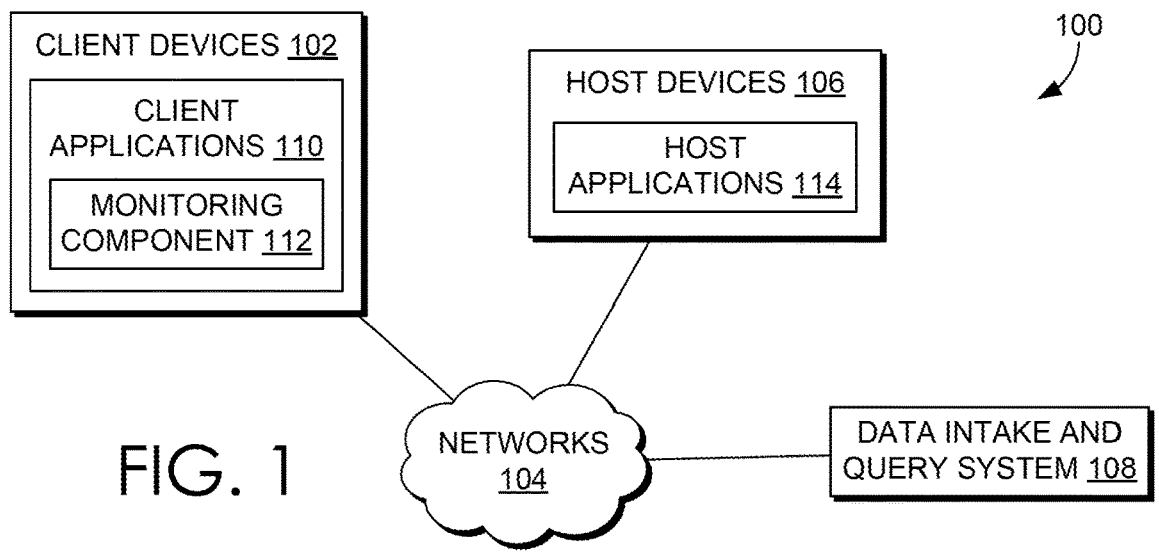
FIG. 1 is a block diagram of an example networked computer environment, in accordance with example embodiments.

In the following description, certain terminology is used to describe various features of the invention. For example, each of the terms "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "computerized" generally represents that any corresponding operations are conducted by hardware in combination with software and/or firmware.

The term "network device" may be construed as any electronic computing system with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, an endpoint device (e.g., a laptop, a mobile phone, a tablet, a computer, etc.), a standalone appliance, a server, a router or other intermediary communication device, a firewall, etc.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Embodiments are described herein according to the following outline:
1.0 General Overview
2.0 Operating Environment
  2.1 Host Devices
  2.2 Client Devices
  2.3 Client Device Applications
  2.4 Data Intake and Query System
  2.5 Data Ingestion
    2.5.1 Input
    2.5.2 Parsing
    2.5.3 Indexing
  2.6 Query Processing
  2.7 Pipelined Search Language
  2.8 Cloud-Based Architecture
3.0 Automated Request Text Population Engine
1.0 General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some data intake and query systems, machine data can have a predefined format, where data items with specific data formats are stored at predefined locations in the data. For example, the machine data may include data associated with fields in a database table. In other data intake and query systems, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store (e.g., non-transitory, computer-readable medium). The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data. As used herein, the phrase to "automatically control" may refer to the execution of instructions by one or more processors and may optionally include interaction with other hardware components without user intervention.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

2.0 Operating Environment

Referring now to FIG. 1, a block diagram of an example networked computer environment 100 is shown in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1 Host Devices

In the illustrated embodiment, a system 100 includes one or more host devices 106. Host devices 106 may broadly include any number of computers, virtual machine data intake and query systems, and/or data centers that are configured to host or execute one or more data intake and query systems of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2 Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for data intake and query system, content provided by one or more host devices 106, etc. Each client device 102 may comprise one or more client applications 110, described in more detail in a separate section hereinafter.

2.3 Client Device Applications

In some embodiments, each client device 102 may host or execute one or more client applications 110 that are capable of interacting with one or more host devices 106 via one or more networks 104. For data intake and query system, a client application 110 may be or comprise a web browser that a user may use to navigate to one or more websites or other resources provided by one or more host devices 106. Additional examples of a client application 110 may include a mobile application (or "app") or a plug-in (e.g., software code configured to interact with and add functionality to existing software applications.

2.4 Data Intake and Query System

The data intake and query system 108 may be event-based system, such as the SPLUNK® ENTERPRISE system developed by Splunk Inc., of San Francisco, Calif. The SPLUNK® ENTERPRISE provides for real-time operational intelligence that enables organizations to collect, index, and search machine data from various websites, applications, servers, networks, and mobile devices that power their businesses. A data intake and query system is particularly useful for analyzing data which is commonly found in system log files, network data, and other data input sources.

During operation, a data intake and query system receives machine data from any type and number of sources (e.g., one or more system logs, streams of network packet data, sensor data, application program data, error logs, stack traces, system performance data, etc.). The data intake and query system parses the machine data to produce events each having a portion of machine data associated with a timestamp. The data intake and query system stores the events in a data store; therefore, enabling queries to be run against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

Examples of data sources 202 that may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system 108 includes one or more forwarders 204 that receive data from a variety of input data sources 202, one or more indexers 206 that process and store the data in one or more data stores 208, and a search head 210. Although the figure illustrates a particular number of components, the data intake and query system 108 may include, or be coupled to, one or more of each component the disclosure is not limited to the particular number shown.

The forwarder 204 and indexers 206 may comprise separate computer systems, or may alternatively comprise separate processes executing on one or more computer systems. Each data source 202 broadly represents a distinct source of data that can be consumed by the data intake and query system 108. During operation, the forwarder 204 identify which indexers 206 receive data collected from a data source 202 and forward the data to the appropriate indexer(s) 206. Forwarders 204 may also perform operations on the data before forwarding, including removing extraneous data, detecting timestamps in the data, parsing data, indexing data, routing data based on criteria relating to the data being routed, and/or performing other data transformations.

In some embodiments, the forwarder 204 may comprise a service accessible to client device 102 via network 104. For example, one type of forwarder 204 may be capable of consuming vast amounts of real-time data from a potentially large number of client devices 102 and/or other network devices. The forwarder 204 may, for example, comprise a computing device which implements multiple data pipelines or "queues" to handle forwarding of network data to indexers 206. The forwarder 204 may also perform many of the functions that are performed by an indexer. For example, the forwarder 204 may perform keyword extractions on raw data or parse raw data to create events, and optionally, generate time stamps for events. Additionally or alternatively, the forwarder 204 may perform routing of events to indexers 206. The data stores 208 may store events derived from machine data from a variety of sources all pertaining to the same component in an information technology (IT) environment, and this data may be produced by the machine in question or by other components in the IT environment.

2.5 Data Ingestion

Figure 3:
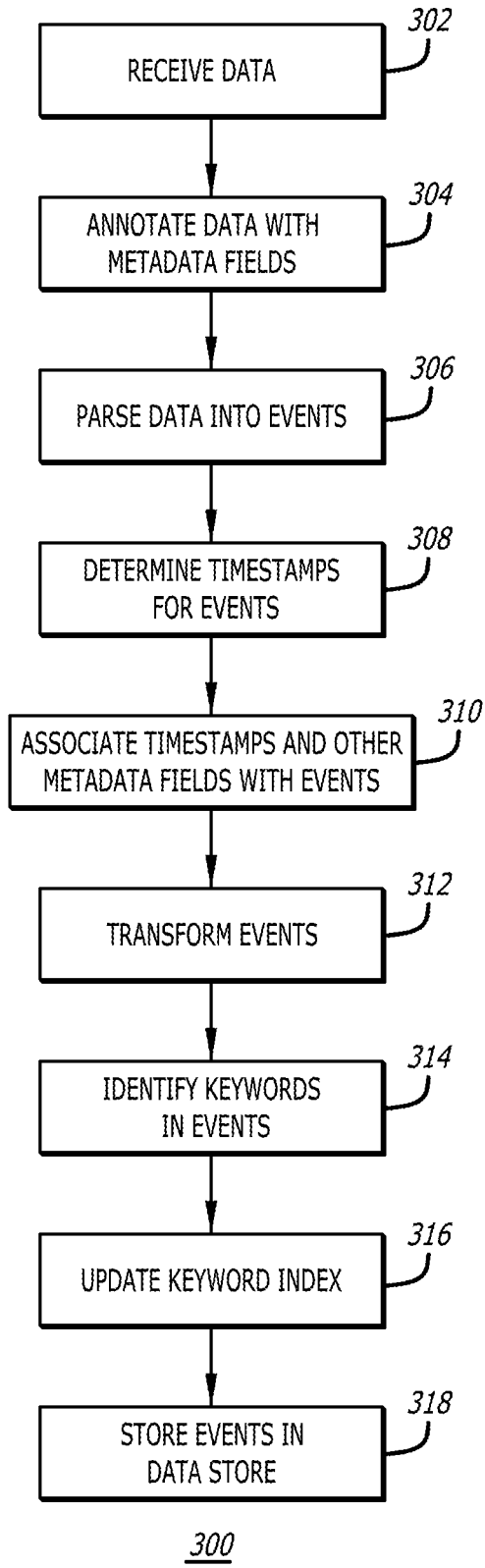
FIG. 3 is a flow diagram of an example method that illustrates how indexers process, index, and store data received from forwarders, in accordance with example embodiments.

FIG. 3 is a flow diagram of an example method that illustrates how indexers process, index, and store data received from forwarders, in accordance with example embodiments. Each block illustrated in FIG. 3 represents an operation performed in the method 300. The data flow illustrated in FIG. 3 is provided for illustrative purposes only; those skilled in the art would understand that one or more of the steps of the processes illustrated in FIG. 3 may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.5.1 Input

Figure 2:
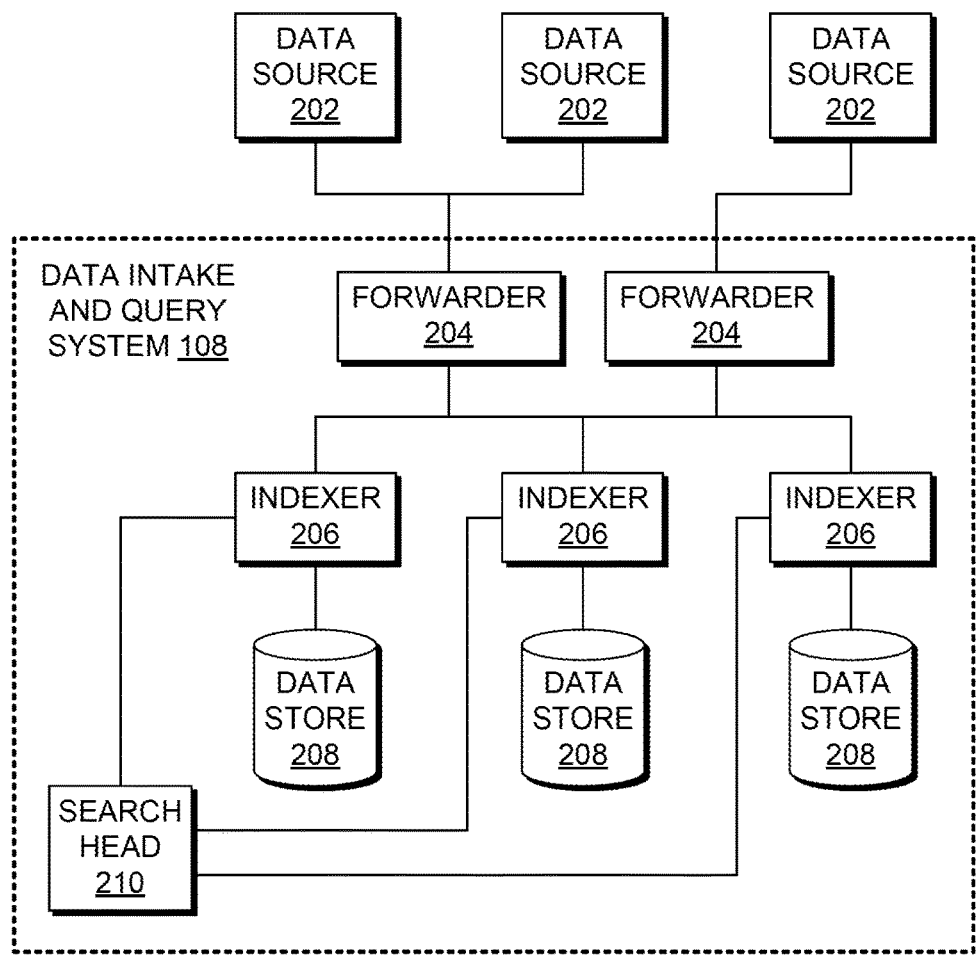
FIG. 2 is a block diagram of an example data intake and query system, in accordance with example embodiments.

At block 302, a forwarder receives data from an input source, such as the data source 202 of FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query data intake and query system to another, or even to a third-party system. The data intake and query system can employ different types of forwarders in a configuration. In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.5.2 Parsing

At block 306, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 308, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 310, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

2.5.3 Indexing

At blocks 314 and 316, an indexer can optionally generate a keyword index to facilitate fast keyword searching for events. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer receives a keyword-based query, the indexer can access the keyword index to quickly identify events containing the keyword.

At block 318, the indexer stores the events with an associated timestamp in a data store. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer may be responsible for storing and searching a subset of the events contained in a corresponding data store. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on Sep. 8, 2015, and in U.S. patent Ser. No. 14/266,817, entitled "Multi-Site Clustering", issued on Sep. 1, 2015, each of which is hereby incorporated by reference in its entirety for all purposes. Further, additional detail generally regarding data ingestion is described in U.S. Pat. No. 10,268,755, entitled "Systems and Methods for Providing Dynamic Indexer Discovery", issued on Apr. 23, 2019, the entire contents of which is hereby incorporated by reference in its entirety for all purposes.

2.6 Query Processing

Figure 4:
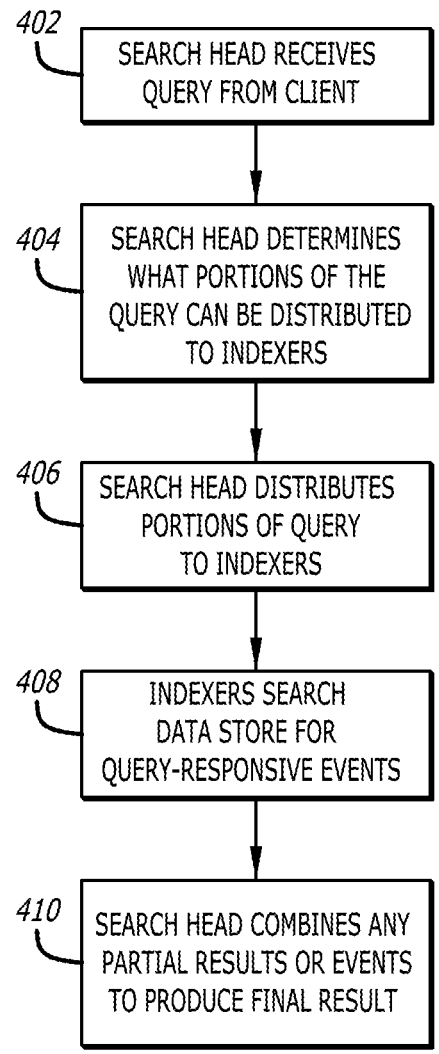
FIG. 4 is a flow diagram of an example method that illustrates how a search head and indexers perform a search query, in accordance with example embodiments.
Figure 5A:
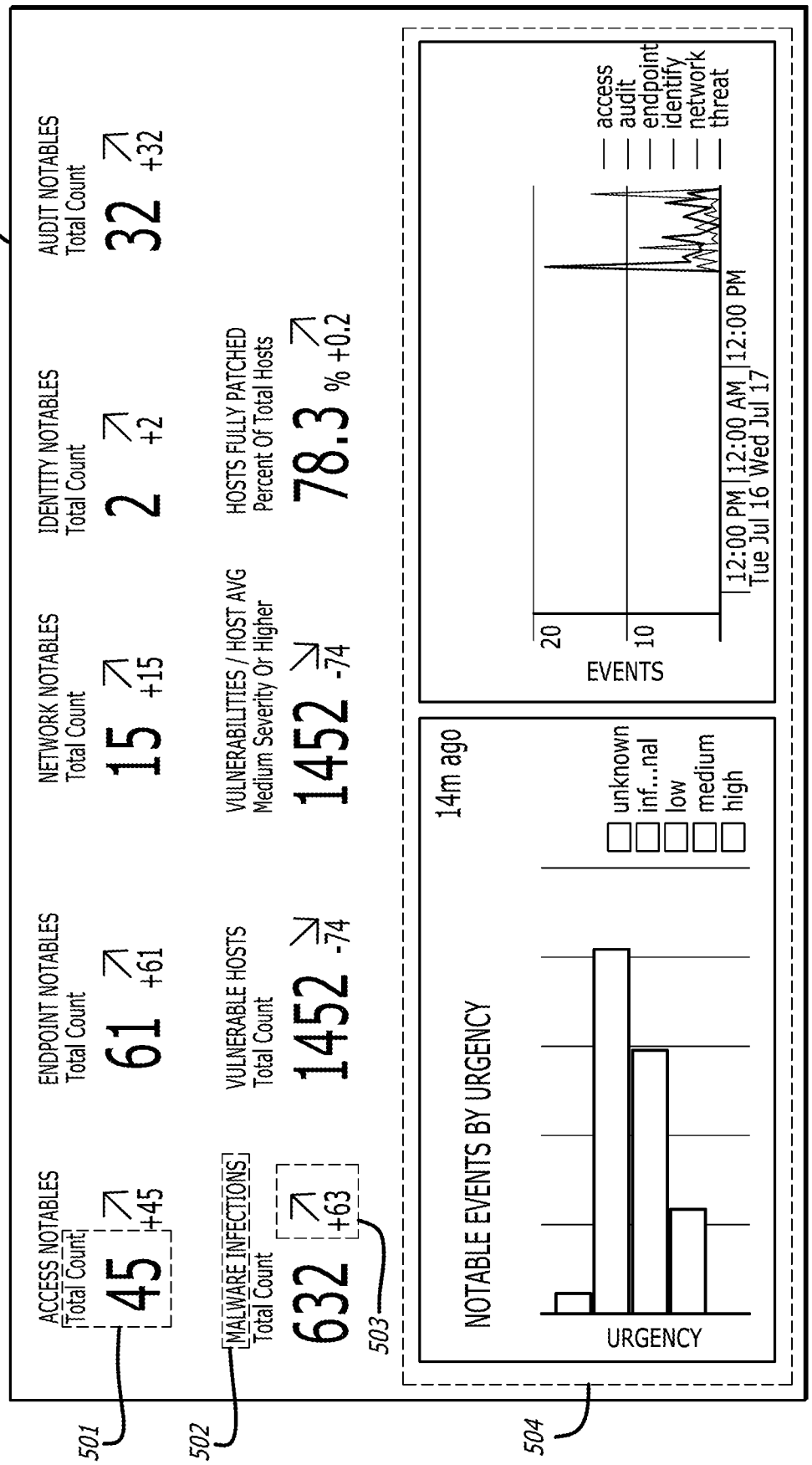
FIG. 5A is an interface diagram of an example user interface of a key indicators view, in accordance with example embodiments.

Referring now to FIG. 4, a flow diagram of an example method that illustrates how a search head and indexers of a data intake and query system perform a search query is shown in accordance with example embodiments. Each block illustrated in FIG. 4 represents an operation performed in the method 400. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 410, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the data intake and query system, e.g., the data intake and query system 108 of FIG. 1, may be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.7 Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

2.8 Cloud-Based Architecture

As shown in the previous figures, various embodiments may refer to a data intake and query system 108 that includes one or more of a search head 210, indexers 206, and a forwarder 204. In other implementations, data intake and query system 108 may have a different architecture, but may carry out indexing and searching in a way that is indistinguishable or functionally equivalent from the perspective of the end user. For example, data intake and query system 108 may be re-architected to run in a stateless, containerized environment. In some of these embodiments, data intake and query system 108 may be run in a computing cloud provided by a third party, or provided by the operator of the data intake and query system 108. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 108.

In some embodiments, a cloud-based data intake and query system (e.g., the data intake and query system 108 configured for use with cloud-computing services) may include an intake system. Such an intake system can include, but is not limited to an intake buffer, such as Apache KAFKA® or Amazon KINESIS®, or an extensible compute layer, such as Apache SPARK™ or Apache FLINK®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

3.0 Automated Request Text Population Engine

An automated request text population engine is discussed below that can receive request texts, such as in the form of a questionnaire, for example, and can perform one or more analyses on each request text, such as comparison with one or more request texts stored within a knowledge base. A request text stored within the knowledge base corresponds to a response (e.g., answer to a question) that may be suitable for the received request text. In some embodiments, the received request text is included in a computer representation of a human-readable form for soliciting information and may be configured for storage on non-transitory, computer-readable medium.

As one example, Company X may be implementing an instance of an automated request text population engine, when the automated request text population engine receives a file that includes a series of prompts each having a corresponding blank text box in which a response to the prompt is expected. For instance, a first prompt may read, "Company Address:" followed by a first blank text box and a second prompt may read, "Company Phone Number:" followed by a second blank text box. The automated request text population engine may identify each prompt as a "request text," and each request text is then compared to the requests text stored in a knowledge base. Prior to analysis of the received file, the knowledge base is generated based on documents and data supplied by or corresponding to Company X. The automated request text population engine identifies a match (or the closest match) to each of the first and second request texts within the knowledge base. For instance, with respect to the first prompt above, the automated request text population engine may determine the closest match stored within the knowledge base is, "What is your company address?" The answer corresponding to this closest match will then be retrieved from the knowledge base and populated into the first blank text box following the first prompt. Similar operations are performed with respect to the second prompt and the second blank text box, and any other prompts determined to be included in the received file.

Therefore, the operations performed by the automated request text population engine do not merely provide an increase in efficiency in populating responses to received request texts, but provide an increase in the accuracy at which responses are provided. As discussed herein, there may be plenty of human error involved in the population of request text responses; however, the automated request text population engine automatically analyzes pre-stored request texts within a knowledge base to determine a match (or most closely matched) request text and provides the corresponding response. Therefore, even as a request text of a first questionnaire may vary slightly from a request text of a second questionnaire with the intent being the same, the automated request text population engine provides the same response to each request text, thereby removing the human-error element. In addition, the automated request text population engine's use of a single knowledge base prevents the use of varying versions of information (e.g., old documents containing outdated information providing responses to some request texts). As the automated population process queries a single knowledge base (one that may be updated at regular intervals such as daily or weekly), the most up-to-date information will be provided as responses.

Figure 6:
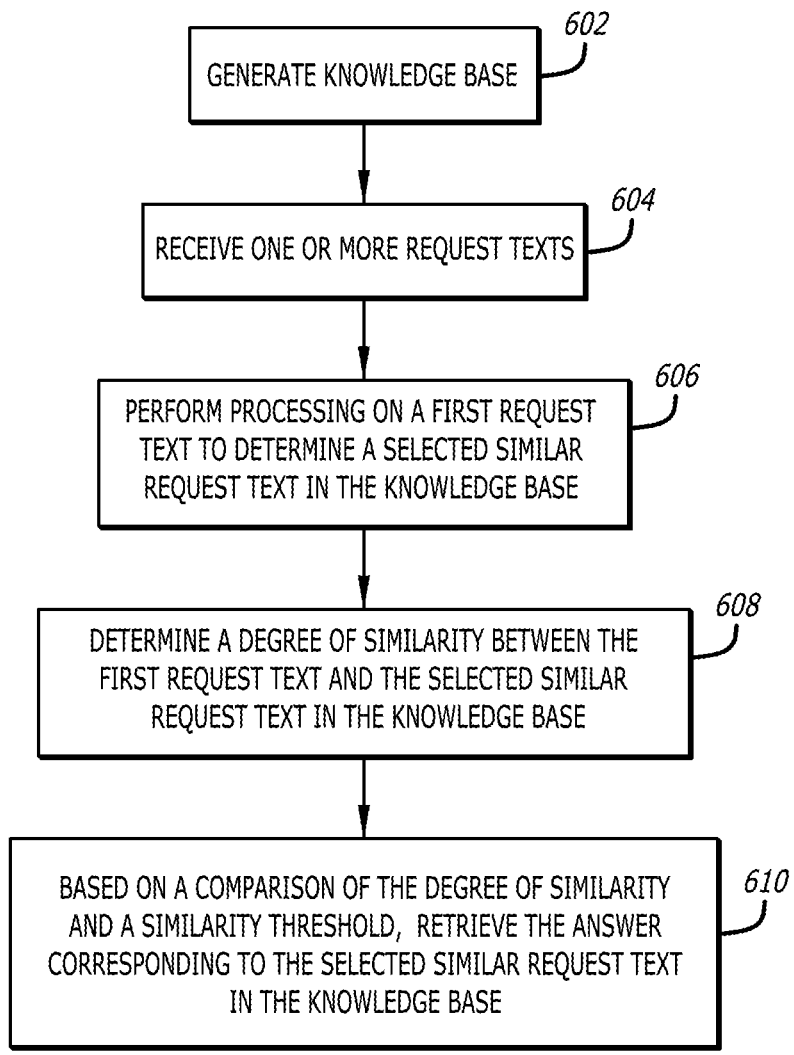
FIG. 6 is a flow diagram of a computerized process for automatic request text population, in accordance with example embodiments.

Referring now to FIG. 6, a flow diagram of a computerized process for automatic request text population is shown in accordance with example embodiments. Each block illustrated in FIG. 6 represents an operation performed in the method 600 for automatic request text population by an automated request text population engine. The method 600 begins with the generation of a knowledge base (block 602). In some embodiments, the generation of the knowledge base may include an analysis of: (i) documents provided to the automated request text population engine, and/or (ii) content located at a web link provided to the automated request text population engine.

For example, documents provided to the automated request text population engine may include Frequently Asked Questions (FAQs) with the corresponding answers, articles, blog posts, comment and answer posts, etc., that include question and answer pairings. Similarly, the automated request text population engine may perform operations that crawl webpages for question and answer pairings, wherein the webpages correspond to uniform resource indicators (URIs), uniform resource locators (URLs), etc., provided to the automated request text population engine. The knowledge base may then be compiled by placing all question and answer pairings into key-value pairs within a repository (e.g., the knowledge base 814 of FIG. 8). In some embodiments, metadata providing additional context may be stored with one or more key-value pairs. For example, the metadata may refer to comments added by an administrator, as discussed below. As a result, the knowledge base may store information associated with a responder of a request text (e.g., such as an organization or individual responding to a questionnaire) in the form of several questions (e.g., request texts) and corresponding answers, wherein the corresponding answer to question ratio may be one to many. Therefore, when the automated request text population engine receives a request text as input, the knowledge base may be utilized in determining a matching (or similar) request text and return the corresponding answer, thereby automatically populating an answer field corresponding to the received request text.

In some embodiments, the knowledge base may be stored in the same form as discussed above with respect to the SPLUNK® ENTERPRISE system. In such an instance, the knowledge base is processed in a similar manner as discussed above with respect to data received from data sources 202 of FIG. 2. For example, the contents of the knowledge base may be processed by one or more forwarders 204 and/or one or more indexers 206 in order enable searching the knowledge base utilizing SPL commands. In some embodiments, the knowledge base is parsed such that the data is organized into events, wherein an indexer determines a source type associated with each data block such as a key-value pair (e.g., by extracting a source type label from the metadata fields associated with the data block, etc.). In addition, a timestamp may be associated with each key-value pair and metadata fields as discussed may also be associated therewith.

Subsequent to the generation of the knowledge base in the presently described embodiment, the automated request text population engine receives one or more request texts for which input is to be provided (block 604). In some embodiments, the one or more request texts refer to a questionnaire. For example, as discussed above, a questionnaire such as a Request for Proposal may be received by a corporation from a potential client that is to be answered, wherein the answers provided by the corporation will be analyzed by the potential client to determine whether to engage in business with the corporation. For purposes of clarity, this disclosure will refer to one or more request texts as a "questionnaire"; however, the disclosure is not intended to be so limited and pertains to any collection of one or more request texts. In some embodiments, the questionnaire may be received in a communication transmitted via a network connection. Additionally, a request text may be accompanied by multiple options for responding (e.g., a multiple answer options). The automated request text population engine may also translate any accompanying options for responding and compare the provided options for responding with a retrieved answer from the knowledge base. For example, when a questionnaire includes a multiple-choice question, e.g., a question and four possible answers, the automated request text population engine obtains the text corresponding to each possible answer and stores each as a possible answer for comparison with a retrieved answer from the knowledge base discussed below.

In one embodiment, the questionnaire may be received as an attachment to an email communication. Receiving the questionnaire, set forth in block 604, may include performing of an optical character recognition (OCR) procedure on the attachment in order to convert the attachment into editable text. The editable text may then be extracted for analysis as described below.

In response to receipt of the plurality of request texts, the automated request text population engine processes a first request text to determine a "similar" request text stored in the knowledge base (referred to herein as the "selected similar request text") (block 606). In one embodiment, the selected similar request text may be the "most similar" request text stored in the knowledge base may be determined. The processing of the first request text may include a plurality of processes, one or more of which may be performed in a serial manner, concurrently (at least partially overlapping in time) or in parallel. As an initial step, the processing may include performance of pre-processing operations that result in a tokenization of the words within the first request text. The pre-processing operations may include removal of "stop words" (examples of which are provided below) and/or punctuation, which, in some cases, may provide no assistance in understanding the first request text. Further, removing the stop words and punctuation separates each remaining word into a "token." Additional pre-processing operations may also be performed including converting all letters to lowercase, stemming words by removing a portion of a word such as one or more letters from the end of a word (e.g., converting "swinging" to "swing"), lemmatizing words (e.g., converting "swung" to "swing") by converting a word to its root form, and/or normalizing words (e.g., converting "btw" to "by the way") by converting abbreviations to the corresponding words canonical form. In order to perform operations corresponding to stemming words, lemmatizing words and/or normalizing words, an additional database can be pre-configured (and likely updated often) in order for the automated request text population engine to perform such operations.

Although not a comprehensive list, the list of stop words as known in the art, may include, but is not limited or restricted to: "ourselves"; "hers"; "between"; "yourself"; "but"; "again"; "there"; "about"; "once"; "during"; "out"; "very"; "having"; "with"; "they"; "own"; "an"; "be"; "some"; "for"; "do"; "its"; "yours"; "such"; "into"; "of"; "most"; "itself"; "other"; "off"; "is"; "s"; "am"; "or"; "who"; "as"; "from"; "him"; "each"; "the"; "themselves"; "until"; "below"; "are"; "we"; "these"; "your"; "his"; "through"; "don"; "nor"; "me"; "were"; "her"; "more"; "himself"; "this"; "down"; "should"; "our"; "their"; "while"; "above"; "both"; "up"; "to"; "ours"; "had"; "she"; "all"; "no"; "when"; "at"; "any"; "before"; "them"; "same"; "and"; "been"; "have"; "in"; "will"; "on"; "does"; "yourselves"; "then"; "that"; "because"; "what"; "over"; "why"; "so"; "can"; "did"; "not"; "now"; "under"; "he"; "you"; "herself"; "has"; "just"; "where"; "too"; "only"; "myself"; "which"; "those"; "i"; "after"; "few"; "whom"; "t"; "being"; "if"; "theirs"; "my"; "against"; "a"; "by"; "doing"; "it"; "how"; "further"; "was"; "here"; and "than."

Figure 7A:
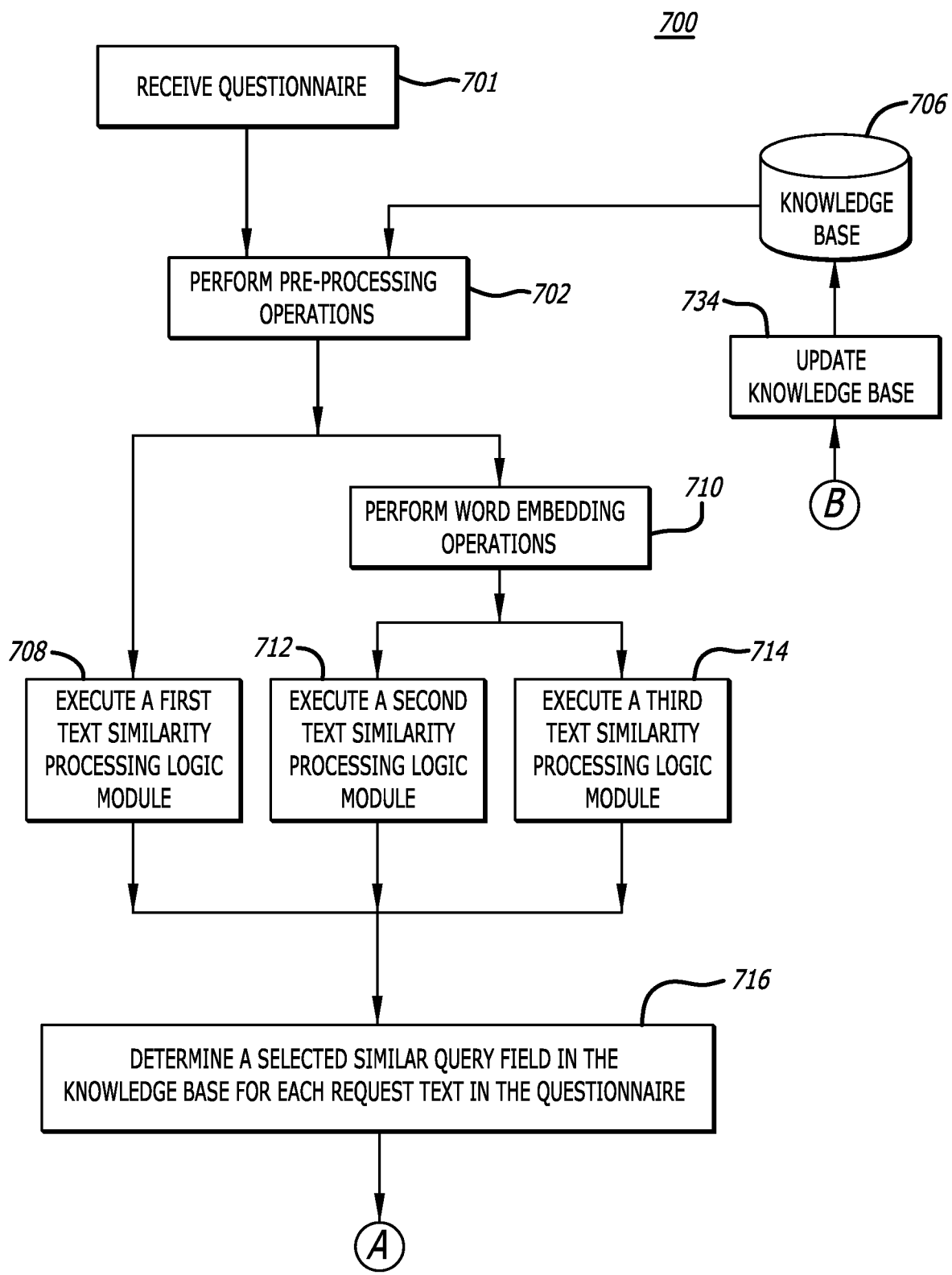
FIGS. 7A-7B illustrate a flow diagram providing detail of the computerized process for automatic requested texted field population of FIG. 6, in accordance with example embodiments.
Figure 7B:
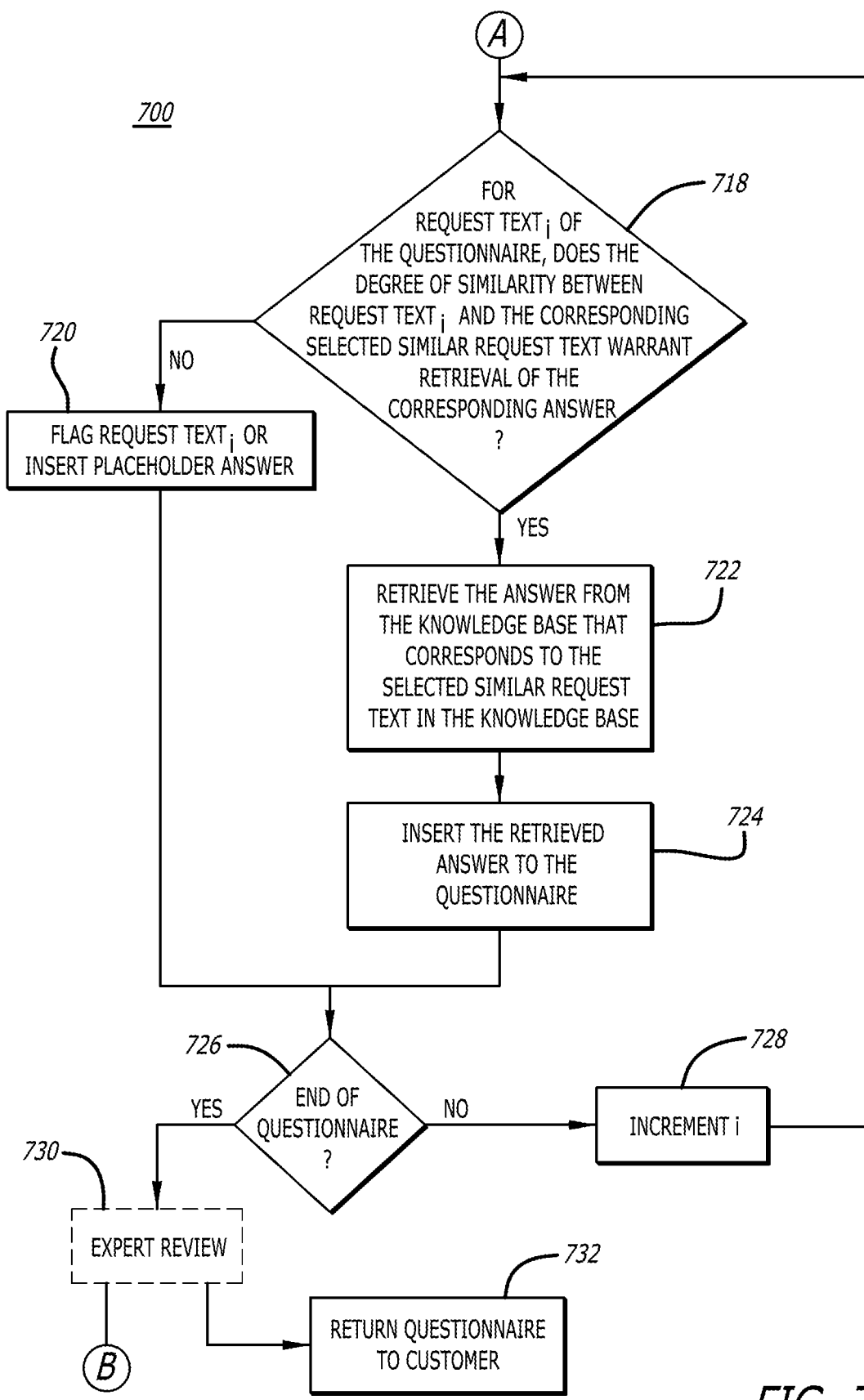

The processing operations of block 606 may include the execution of one or more text similarity processing logic modules (as illustrated in FIGS. 7A-7B). For instance, a first text similarity processing logic module may be executed using the tokenized text version of the first request text as input. The operations performed by the first text similarity processing logic module may include an analysis of the tokenized text of the first request text and entries within the knowledge base in order to determine a "similar" request text stored in the knowledge base (referred to herein as the "selected similar request text"). In one embodiment, the selected similar request text may represent the "most similar" request text stored in the knowledge base. In one specific embodiment, the first text similarity processing logic module may include the Bilingual Evaluation Understudy (BLEU) algorithm. The first text similarity processing logic (e.g., operations including the BLEU algorithm) may include operations of counting matching n-grams in one text to n-grams in a second text. For instance, a comparison using a 1-gram (or unigram) corresponds to a comparison between singular tokens, and a comparison using a bigram would be corresponds to a comparison between word pairings, wherein a word pairing represents a set of tokens comprising a request text. The comparisons may be performed without respect to the ordering of the words within each word pairing.

The BLEU algorithm is preferred in determining the similarity between a request text and questions stored within the knowledge base when the request text is a question that is a direct match (or very close match) of a question stored in the knowledge. For instance, a questionnaire may include one or more questions that routinely appear in questionnaires received by an organization or an individual. When a request text is a direct match with a question in the knowledge base, the automated request text population engine may skip performance of a word embedding process as described below, which saves time and computing resources. Values returned by the BLEU algorithm that are close to 1 indicate a direct match (or very close match), which may enable the automated request text population engine to retrieve an answer corresponding to the match answer within the knowledge base without performing a word embedding process and/or operations of other text similarity logic modules.

In one embodiment, as alternative or additional processing operations, a cosine measure is used to determine the similarity between the tokenized text of the first request text and each entry within the knowledge base. The result of the cosine measure between two vectors (a scalar value) indicates the similarity between the two vectors, where −1 indicates exactly opposite (i.e., not similar) and 1 indicates exactly the same. In Natural Language Processing (NLP), the cosine similarity is particularly used in positive space (e.g. after one hot encoding, which refers to a representation of categorical variables as binary vectors), where the outcome is neatly bounded in [0, 1]. In utilizing the cosine measure, or cosine similarity, to determine the similarity of the request text and an answer stored in the knowledge base, the automated request text population engine determines the cosine angle between a vector representing the requested text and a vector representing an answer in the knowledge base.

In yet alternative embodiments, the method 600 may include execution of either a second or a third text similarity processing logic module. In some embodiments, subsequent to the pre-processing operations and prior to execution of either the second or the third text similarity processing logic module, operations comprising a word embedding process may be performed, which generally include the conversion of the tokenized, editable text comprising the first request text (e.g., a first question) into a mathematical vector comprising a plurality of numerical characters. An example of the word embedding process includes a trained neural network receiving a text corpus as input (e.g., the tokenized text of the first request text) and outputting a numeric vector representing the text of the first request text. The output vector may be referred to as a neural word embedding. Converting the text corpus of the first request text to a numeric vector enables operations to be executed that compare the similarity of numeric vector representing the first request text to numeric vectors within the knowledge base that represent a collective of stored request text corpora. The result of the word embedding process may be referred to as "vectorized text." The vectorized text is then utilized in the processing of text similarity logic modules such as the cosine measure discussed above as well as the Word Mover's Distance (WMD) algorithm and the Soft Cosine Measure (SCM) algorithm discussed below as utilization of a single vector is more efficient than utilization of a plurality of words the comprise each of the request text and each answer stored within the knowledge base.

Following performance of the word embedding operations, execution of the second or the third text similarity processing logic modules may include an analysis of the vectorized text of the first request text and entries within the knowledge base in order to determine a "similar" request text stored in the knowledge base (referred to herein as the "selected similar request text"). In one embodiment, the selected similar request text may represent the "most similar" request text stored in the knowledge base. In one embodiment, the second text similarity processing logic module may include the Word Mover's Distance (WMD) algorithm, and the third text similarity processing logic module may include the Soft Cosine Measure (SCM) algorithm. The processing of the first request text may include execution of one or more of the first, second or third text similarity processing logic modules.

Still referring to FIG. 6, following the performance of processing on a first request text to determine the selected similar request text in the knowledge base, method 600 continues by determining a degree of similarity between the first request text of the questionnaire and the selected similar request text in the knowledge base (block 608). The degree of similarity may be determined in one of several methods. For instance, as discussed above and illustrated in greater detail in FIG. 7A, one or more of text similarity processing logic modules may be executed in determining a request text stored in the knowledge base that is selected similar to a request text of the questionnaire being analyzed. For example, one method of determining the degree of similarity between the request text of the questionnaire being analyzed and the selected similar request text of the knowledge base may be based on the highest similarity score produced by one of the plurality of text similarity processing logic modules (e.g., in which case, the "most similar" request text is determined). However, a request text stored within the knowledge may be selected as being is similar to the request text of the questionnaire being analyzed based on a correlation between the request text in the knowledge base and the request text of the questionnaire being analyzed (e.g., the received request text).

As yet another example, following normalization of each of the similarity scores produced, an ensemble (e.g., a mean, a weighted averaged, bagging, boosting, stacking) may be taken of the normalized similarity scores may utilized. In lieu of the average, the median similarity score, if applicable, may be utilized.

In any of the methods for determining the degree of similarity, when one or more of text similarity processing logic modules are utilized, a normalization process may be performed on each of the similarities generated by the text similarity processing logic modules. For example, referring to the text similarity algorithms referenced above: the BLEU algorithm produces a similarity score that is a scalar value between 0 and 1; the cosine measure algorithm produces a similarity score that is a value between −1 and 1; the WMD algorithm produces a similarity score that is a scalar value between 0 and 1; and the SCM algorithm produces a similarity score that is a value between −1 and 1. Therefore, in order to compare or perform computations with the similarity scores, a normalization process is performed.

Based on results produced by a comparison of the determined degree of similarity and a similarity threshold, the method 600 continues by retrieving the answer in the knowledge base that corresponds to the selected similar request text in the knowledge base (block 610). In one embodiment, the comparison of the determined degree of similarity and a similarity threshold may include a determination as to whether the determined degree of similarity is greater than or equal to the similarity threshold. In other embodiments, the comparison may include a determination as to whether the determined degree of similarity is less than, or less than or equal to, the similarity threshold.

However, when the determined degree of similarity does not warrant retrieval of the answer in the knowledge base corresponding to the selected similar request text in the knowledge base, the method 600 may flag the first request text for review by an administrator following completion of the method 600. In one embodiment, the determined degree of similarity may not warrant retrieval of the answer when the determined degree of similarity is less than a similarity threshold.

Additionally, as method 600 has been described above with respect to a first request text, it should be understood that blocks 606-610 of the method 600 may be repeated for each request text of the received questionnaire.

Referring now to FIGS. 7A-7B, a flow diagram providing detail of the computerized process for automatic request text population of FIG. 6 is illustrated in accordance with example embodiments. Each block illustrated in FIGS. 7A-7B represents an operation performed in the method 700 for automatic request text population by an automated request text population engine. It is assumed that prior to the beginning of the method 700, that a knowledge base has been generated as discussed above with respect to FIG. 6.

The method 700, performed by the automated request text population engine, begins with the receipt of a questionnaire, which as discussed above, includes one or more request texts (block 701). Following the receipt of the questionnaire, the automated request text population engine performs pre-processing operations on the request texts included in the questionnaire (block 702). As discussed above, the pre-processing operations may include the removal of "stop words" and punctuation and the separation of each remaining word into a "token." Further examples of additional pre-processing operations discussed above may include stemming words, lemmatizing words and/or normalizing words.

Contents of the knowledge base 706 may be passed along with the tokens resulting from the pre-processing operations to any of the operations corresponding to block 710-714 of the method 700 discussed below (as illustrated in FIG. 7A). However, in other embodiments, one or more of the logic modules included within the automated request text population engine may access the knowledge base 706 during performance of the operations discussed herein.

As illustrated, one or more text similarity processing logic modules (such as modules 708, 712 and/or 714) may be executed, taking the tokenized words (and optionally contents of the knowledge) as input. FIG. 7A illustrates that execution of a first text similarity processing logic module may occur using the results of the tokenized words (and optionally contents of the knowledge) as input (block 708). In one embodiment, the first text similarity processing logic module may include either the BLEU algorithm or performance of a cosine measure as discussed above. One function of BLEU is to evaluate the quality of machine-translated text, wherein the quality of the translation corresponds to the similarity of the translation based on the degree of matches of n-grams bag of words between request texts.

Additionally, or in the alternative, the method 700 may include performance of word embedding operations using the tokenized words and content of the knowledge base (block 710). As discussed above, the word embedding operations may include a trained neural network receiving a text corpus as input (e.g., the tokenized request texts) and outputs a numeric vector representing the tokenized text of each request text.

In the presently described embodiment, subsequently and utilizing the numeric vectors and content of the knowledge base, the method 700 continues with the performance of one or more text similarity processing logic modules (blocks 712 and 714). In some embodiments, when a plurality of text similarity processing logic modules are executed, such execution may occur in parallel. In some embodiments, the execution may occur serially or concurrently. In some embodiments, as discussed above, execution of the second and third text similarity processing logic modules may include execution of the WMD algorithm and/or the SCM algorithm.

Following the performance of at least one of the first, second or third text similarity processing logic modules, the automated request text population engine determines a similar request text in the knowledge base for each request text in the questionnaire (wherein the determined similar request text is referred to as the "selected similar request text") (block 716). Determination of the selected similar request text in the knowledge base for each request text in the questionnaire may include an analysis of the results produced by the first, second and/or third text similarity processing logic modules to determine which request text resulted in the "highest" similarity score. Herein, "highest" does not necessarily refer to the greatest-in-value as one or more text similarity processing logic modules may provide a result within a range of −1 to 1 (as opposed to 0 to 1). Therefore, the term "highest" is in reference to the similarity score that indicates request texts most likely to be the same or similar. It should be noted that in some embodiments, the similarity scores may be normalized; thus, providing for a 1:1 comparison among result of the first, second and/or third text similarity processing logic modules.

Referring now to FIG. 7B, the method 700 continues with a determination, for a request text, where 'i'≤the number of request texts in the questionnaire, as to whether the degree of similarity between the request text and the corresponding selected similar request text in the knowledge base warrants retrieval of the answer of the corresponding similar request text (block 718). For example, the determination may indicate whether is the degree of similarity is greater than or equal to a similarity threshold.

When the degree of similarity for the request text does not warrant retrieval of the answer of the corresponding similar request text ("no" at block 718), the request text may be flagged for expert or administrator review, or a placeholder answer may be inserted into the questionnaire (e.g., wherein the questionnaire is maintained as a file on a network device) (block 720). For example, the degree of similarity may not warrant retrieval when the degree of similarity is less than the similarity threshold. However, when the degree of similarity for the request text does warrant retrieval of the answer of the corresponding similar request text ("yes" at block 718), the answer paired to the corresponding request text in the knowledge base is retrieved and inserted into the questionnaire, or a corresponding file (blocks 722 and 724). For example, the degree of similarity may warrant retrieval when the degree of similarity is greater than or equal to the similarity threshold.

In the presently described embodiment, subsequently, a determination is made as to whether request text represents the last request text in the questionnaire (block 726). When the request text is not the last request text in the questionnaire ("no" at block 726), 'i' is incremented and the method 700 returns to block 718. When the request text is the last request text in the questionnaire ("yes" at block 726), the questionnaire including the answers populated by the automated request text population engine may be optionally provided to an administrator for expert review (or at least the flagged request texts) (block 730).

Following the optional expert review, the questionnaire including the answers populated by the automated request text population engine (and optionally those populated by an administrator) is provided to the requestor who submitted the questionnaire (or user/network device that provided the questionnaire or is associated therewith) (block 732).

Following the expert review and returning to FIG. 7A, the method 700 may include updating the knowledge base with entries, comments and/or selected or corrected answers or request texts as determined during expert review (block 734).

Figure 8:
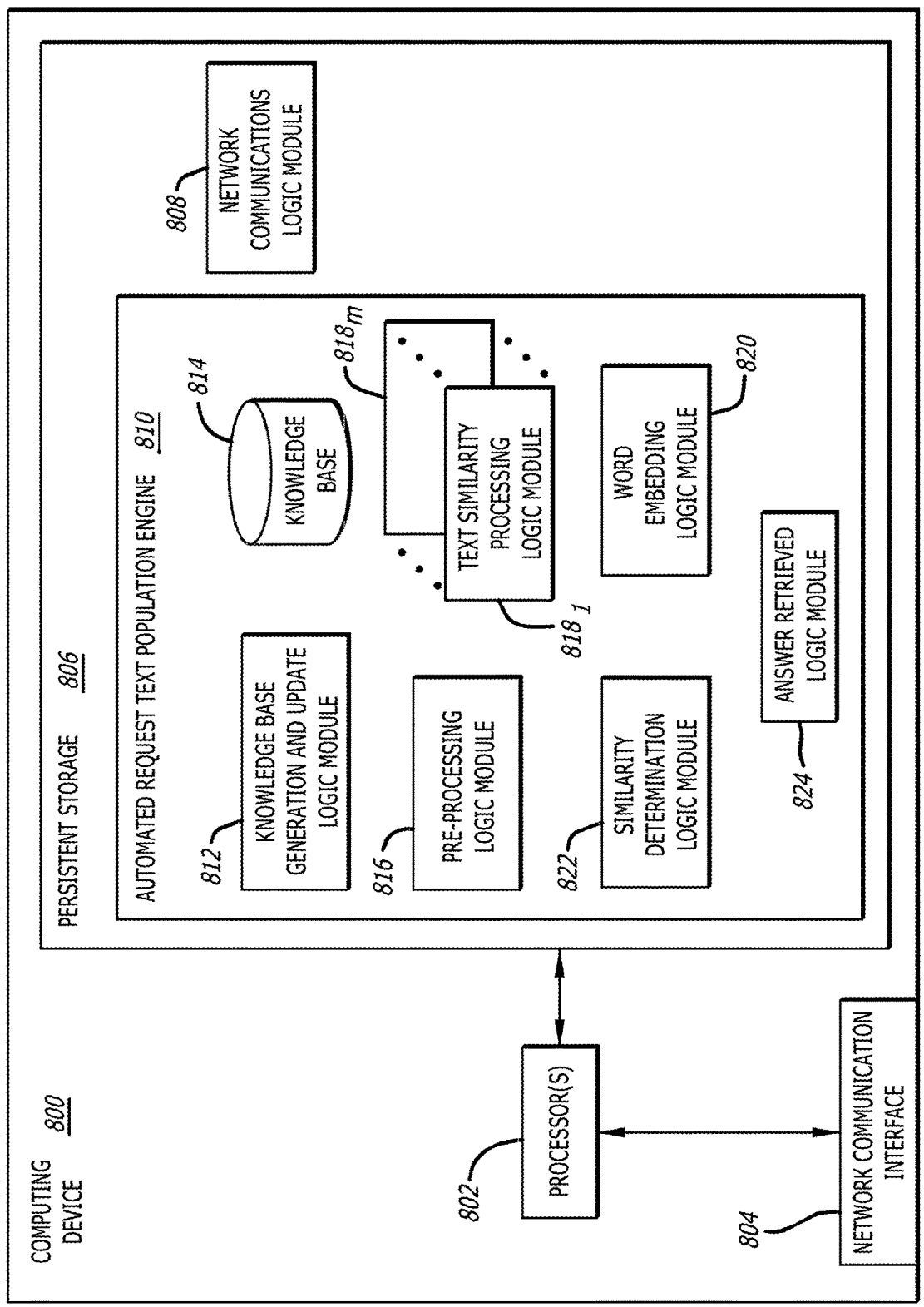
FIG. 8 is an example embodiment of a logical representation of the automated request text population engine, in accordance with example embodiments.

Now referring to FIG. 8, an example embodiment of a logical representation of an automated request text population engine 810 is shown in accordance with some embodiments. The automated request text population engine 810, in an embodiment may be stored on a non-transitory computer-readable storage medium ("persistent storage") 806 of a computing device 802 that includes a housing. The communication interface 804, in combination with a communication logic 808, enables communications with external network devices and/or other network appliances to receive updates for the automated request text population engine 810. According to one embodiment of the disclosure, the communication interface 804 may be implemented as a physical interface including one or more ports for wired connectors. Additionally, or in the alternative, the communication interface 804 may be implemented with one or more radio units for supporting wireless communications with other electronic devices. The communication interface logic 808 may include logic for performing operations of receiving and transmitting one or more objects via the communication interface 804 to enable communication between the automated request text population engine 810 and network devices via a network (e.g., the internet) and/or cloud computing services.

The processor(s) 802 is further coupled to the persistent storage 806. According to one embodiment of the disclosure, the automated request text population engine 810, stored on the persistent storage 806, includes: (i) a knowledge base generation and update logic module 812, (ii) a knowledge base repository 814, (iii) a pre-processing logic module 816, (iv) one or more text similarity processing logic modules 818₁-818_M (wherein M≥1), (v) a word embedding logic module 820, (vi) a similarity determination logic module 822, and (vii) an answer retrieval logic module 824.

Upon execution by the processors 802, these logic modules cause the performance of the operations discussed above with respect to FIGS. 6-7B. For example, the knowledge base generation and update logic module 812 may perform operations corresponding to blocks 602 and 812. The pre-processing logic module 816 may perform operations corresponding to blocks 606 and 702. The one or more text similarity processing logic modules 818₁-818_M may perform operations corresponding to blocks 606, 708, 712 and 714. The word embedding logic module 820 may perform operations corresponding to blocks 606 and 710. The similarity determination logic module 822 may perform operations corresponding to blocks 608, 716, 718 and 720. The answer retrieval logic module 824 may perform operations corresponding to blocks 610, 722 and 724. Of course, when implemented as hardware, one or more of these logic units could be implemented separately from each other.

In the foregoing description, the invention is described with reference to specific example embodiments thereof. It will, however, be evident that various modifications and changes may be made thereto without departing from the broader spirit and scope of the invention as set forth in the appended claims.

What is claimed is:

1. A computerized method comprising:
   receiving a first request text;
   automatically performing processing on the first request text resulting in determination of a similar request text in a knowledge base, wherein automatically performing processing includes performing word embedding operations of converting the first request text into a vector using a trained neural network, and performing a comparison analysis of vectorized content of the vector with entries of the knowledge base through execution of one or more text similarity processing logic modules;
   determining a degree of similarity between the first request text and the similar request text;
   based on results produced by a comparison between the degree of similarity and a similarity threshold, retrieving, from the knowledge base, an answer associated with the similar request text; and
   populating, in a data store, a response for the first request text with the answer.

2. The computerized method of claim 1, wherein the first request text is included in a computer representation of a human-readable form for soliciting information.

3. The computerized method of claim 1, further comprising:
   analyzing at least one of received documents or content located at a received web link resulting in determination of request text and answer pairings;
   compiling the request text and answer pairings into key-value pairs; and
   storing the key-value pairs in the knowledge base.

4. The computerized method of claim 1, wherein automatically performing processing includes performing pre-processing operations by at least removing stop words and punctuation, and separating each remaining word into a token resulting in tokenized text.

5. The computerized method of claim 1, wherein automatically performing processing includes separating one or more words in the first request text into one or more tokens resulting in tokenized text.

6. The computerized method of claim 1, wherein automatically performing processing further includes executing a first text similarity processing logic module to compare the first request text with content of entries of the knowledge base using a Bilingual Evaluation Understudy algorithm.

7. The computerized method of claim 1, wherein the one or more text similarity processing logic modules include one or more of a Word Mover's Distance algorithm or a Soft Cosine Measure algorithm.

8. The computerized method of claim 1, wherein performing the comparison analysis of the vectorized content of the vector with the entries of the knowledge base includes a first comparison analysis including execution of a Word Mover's Distance algorithm and a second comparison analysis including execution of a Soft Cosine Measure algorithm.

9. The computerized method of claim 1, wherein the first request text is one of a plurality of request texts, and wherein the response includes an answer for each request text of the plurality of request texts.

10. The computerized method of claim 1, wherein determining the similar request text in the knowledge base includes determining text stored in the knowledge base that is most similar to the first request text.

11. The computerized method of claim 1, wherein the results indicate whether the degree of similarity is equal to or greater than the similarity threshold.

12. A non-transitory computer readable storage medium having stored thereon instructions, the wherein the instructions, when executed by one or more processors, cause the one or more processors to perform operations comprising:
   receiving a first request text;
   automatically performing processing on the first request text resulting in determination of a similar request text in a knowledge base, wherein automatically performing processing includes performing word embedding operations of converting the first request text into a vector using a trained neural network, and performing a comparison analysis of vectorized content of the vector with entries of the knowledge base through execution of one or more text similarity processing logic modules;
   determining a degree of similarity between the first request text and the similar request text;
   based on results produced by a comparison between the degree of similarity and a similarity threshold, retrieving, from the knowledge base, an answer associated with the similar request text; and
   populating, in a data store, a response for the first request text with the answer.

13. The non-transitory computer readable storage medium of claim 12, wherein the first request text is included in a computer representation of a human-readable form for soliciting information.

14. The non-transitory computer readable storage medium of claim 12, wherein the instructions, when executed by the one or more processors, cause the one or more processors to perform further operations comprising:
   analyzing at least one of received documents or content located at a received web link resulting in determination of request text and answer pairings;

compiling the request text and answer pairings into key-value pairs; and storing the key-value pairs in the knowledge base.

15. The non-transitory computer readable storage medium of claim 12, wherein automatically performing processing includes performing pre-processing operations by at least removing stop words and punctuation, and separating each remaining word into a token resulting in tokenized text.

16. The non-transitory computer readable storage medium of claim 12, wherein automatically performing processing includes separating one or more words in the first request text into one or more tokens resulting in tokenized text.

17. The non-transitory computer readable storage medium of claim 12, wherein automatically performing processing further includes executing a first text similarity processing logic module to compare the first request text with content of entries of the knowledge base using a Bilingual Evaluation Understudy algorithm.

18. The non-transitory computer readable storage medium of claim 12, wherein the one or more text similarity processing logic modules include one or more of a Word Mover's Distance algorithm or a Soft Cosine Measure algorithm.

19. The non-transitory computer readable storage medium of claim 12, wherein performing the comparison analysis of the vectorized content of the vector with the entries of the knowledge base includes a first comparison analysis including execution of a Word Mover's Distance algorithm and a second comparison analysis including execution of a Soft Cosine Measure algorithm.

20. The non-transitory computer readable storage medium of claim 12, wherein the first request text is one of a plurality of request texts, and wherein the response includes an answer for each request text of the plurality of request texts.

21. The non-transitory computer readable storage medium of claim 12, wherein determining the similar request text in the knowledge base includes determining text stored in the knowledge base that is most similar to the first request text.

22. The non-transitory computer readable storage medium of claim 12, wherein the results indicate whether the degree of similarity is equal to or greater than the similarity threshold.

23. A system comprising:
a memory to store executable instructions; and
a processing device coupled with the memory, wherein the instructions, when executed by the processing device, cause operations including:
  receiving a first request text;
  automatically performing processing on the first request text resulting in determination of a similar request text in a knowledge base, wherein automatically performing processing includes performing word embedding operations of converting the first request text into a vector using a trained neural network, and performing a comparison analysis of vectorized content of the vector with entries of the knowledge base through execution of one or more text similarity processing logic modules;
  determining a degree of similarity between the first request text and the similar request text;
  based on results produced by a comparison between the degree of similarity and a similarity threshold, retrieving, from the knowledge base, an answer associated with the similar request text; and
  populating, in a data store, a response for the first request text with the answer.

24. The system of claim 23, wherein the first request text is included in a computer representation of a human-readable form for soliciting information.

25. The system of claim 23, wherein the operations further comprise:
analyzing at least one of received documents or content located at a received web link resulting in determination of request text and answer pairings;
compiling the request text and answer pairings into key-value pairs; and
storing the key-value pairs in the knowledge base.

26. The system of claim 23, wherein automatically performing processing includes performing pre-processing operations by at least removing stop words and punctuation, and separating each remaining word into a token resulting in tokenized text.

27. The system of claim 23, wherein automatically performing processing includes separating one or more words in the first request text into one or more tokens resulting in tokenized text.

28. The system of claim 23, wherein automatically performing processing further includes executing a first text similarity processing logic module to compare the first request text with content of entries of the knowledge base using a Bilingual Evaluation Understudy algorithm.

29. The system of claim 23, wherein the one or more text similarity processing logic modules include one or more of a Word Mover's Distance algorithm or a Soft Cosine Measure algorithm.

30. The system of claim 23, wherein performing the comparison analysis of the vectorized content of the vector with the entries of the knowledge base includes a first comparison analysis including execution of a Word Mover's Distance algorithm and a second comparison analysis including execution of a Soft Cosine Measure algorithm.

31. The system of claim 23, wherein the first request text is one of a plurality of request texts, and wherein the response includes an answer for each request text of the plurality of request texts.

32. The system of claim 23, wherein determining the similar request text in the knowledge base includes determining text stored in the knowledge base that is most similar to the first request text.

33. The system of claim 23, wherein the results indicate whether the degree of similarity is equal to or greater than the similarity threshold.

* * * * *